United States Patent
Qutub et al.

(10) Patent No.: US 6,769,452 B2
(45) Date of Patent: Aug. 3, 2004

(54) LEAK-FREE FLEXIBLE CONDUIT

(75) Inventors: Abe Qutub, Beaverton, OR (US); Mike Williams, Lake Oswego, OR (US)

(73) Assignee: DQP, LLC, Lake Oswego, OR (US)

( * ) Notice: Subject to any disclaimer, the term of this patent is extended or adjusted under 35 U.S.C. 154(b) by 0 days.

(21) Appl. No.: 10/301,164

(22) Filed: Nov. 20, 2002

(65) Prior Publication Data

US 2003/0094207 A1 May 22, 2003

Related U.S. Application Data

(60) Provisional application No. 60/372,342, filed on May 28, 2002, and provisional application No. 60/331,794, filed on Nov. 20, 2001.

(51) Int. Cl.[7] .............................................. F16L 11/00
(52) U.S. Cl. ...................... 138/114; 138/122; 138/127; 138/126; 138/139; 138/148
(58) Field of Search ................................ 138/120, 122, 138/112, 114, 126, 127, 139, 148, 155

(56) References Cited

U.S. PATENT DOCUMENTS

| | | | | |
|---|---|---|---|---|
| 3,771,570 A | * | 11/1973 | Coleman | 138/131 |
| 3,901,539 A | * | 8/1975 | Ijzerman | 138/110 |
| 3,911,961 A | * | 10/1975 | Peyton et al. | 139/113 |
| 3,934,617 A | * | 1/1976 | Henderson | 138/114 |
| 4,147,185 A | * | 4/1979 | Hines | 138/121 |
| 4,345,430 A | * | 8/1982 | Pallo et al. | 60/282 |
| 4,846,147 A | * | 7/1989 | Townsend et al. | 126/307 R |
| 4,998,597 A | * | 3/1991 | Bainbridge et al. | 181/243 |
| 5,004,018 A | * | 4/1991 | Bainbridge | 138/149 |
| 5,101,918 A | * | 4/1992 | Smet | 138/114 |
| 5,494,319 A | * | 2/1996 | Thomas | 138/154 |
| 5,600,752 A | * | 2/1997 | Lopatinsky | 138/33 |
| 5,829,483 A | * | 11/1998 | Tukahara et al. | 139/109 |
| 6,116,287 A | * | 9/2000 | Gropp et al. | 138/114 |
| 6,354,332 B1 | * | 3/2002 | Burkhardt et al. | 138/109 |

* cited by examiner

Primary Examiner—James Hook
(74) Attorney, Agent, or Firm—Marger Johnson & McCollom, PC

(57) ABSTRACT

A leak-free flexible conduit and method of making the same is described. By attaching a flexible outer hose to a flexible inner hose without directly clamping the outer hose to the inner hose, the life of the inner hose is increased. Furthermore, the outer flexible hose creates a heat-resistant, airtight seal that prevents exhaust leaks from the inner flexible hose from escaping, substantially reduces the heat lost to the atmosphere, decreases the amount of vibration, reduces noise, and protects the inner flexible hose from corrosive elements and contaminants, thereby also extending the life of the inner flexible hose.

23 Claims, 2 Drawing Sheets

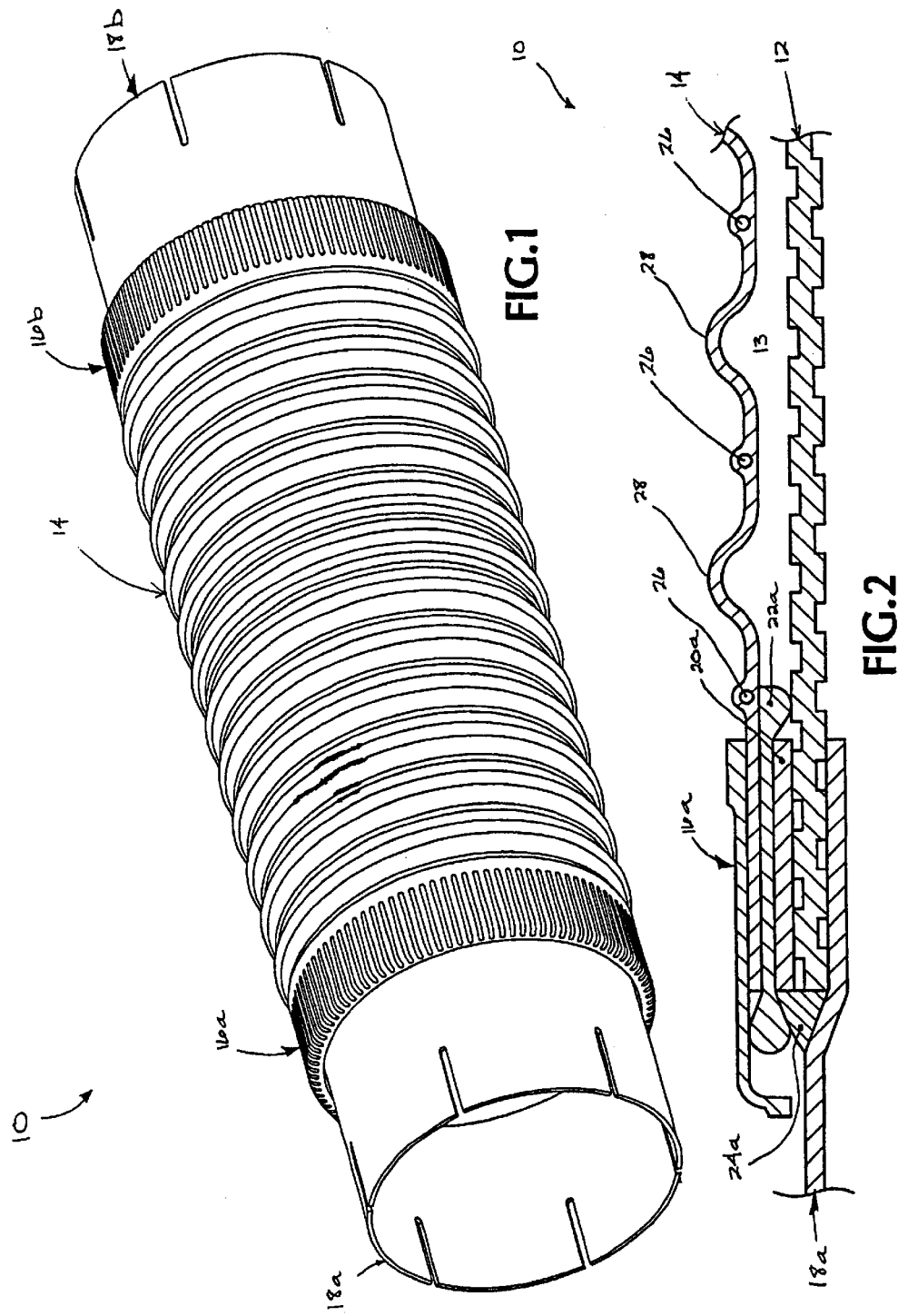

LEAK-FREE FLEXIBLE CONDUIT

CROSS-REFERENCES TO RELATED APPLICATIONS

This application claims priority to U.S. Provisional Patent Application No. 60/372,342 (LEAK FREE FLEXIBLE CONDUIT), which was accorded a filing date of May 28, 2002. The application also claims priority to U.S. Provisional Patent Application No. 60/331,794 (LEAK FREE FLEXIBLE EXHAUST CONDUIT) that was filed on Nov. 20, 2001. Both applications are hereby incorporated by reference.

BACKGROUND OF THE INVENTION

1. Field of the Invention

The invention relates in general to flexible conduit and methods of forming flexible conduit, and in particular to a leak-free flexible conduit.

2. Description of the Related Art

Flexible conduits are presently in wide use in heavy and medium duty truck engine exhaust systems. None, however, are leak free.

A typical automotive engine exhaust system is comprised mainly of steel exhaust pipes and at least one exhaust muffler. The steel exhaust pipes provide a conduit for the engine exhaust to be transferred from the engine exhaust outlet to the muffler and from there to the atmosphere. On heavy and medium duty trucks, for example, mufflers are mounted either on the outside of the driver's compartment or the frame rail.

Because the engine vibrates, it is necessary to provide a flexible joint in the pipes connecting the engine exhaust outlet to the muffler, which is mounted on either the cab or the frame rail. Employing such a flexible conduit insures against the failure of the steel exhaust pipes. Additionally, a flexible joint in the exhaust pipe connecting the engine to the muffler absorbs the expansion and contraction of the steel pipes, which results from temperature fluctuations.

As described above, a flexible joint is essential to the longevity of the exhaust piping system. However, a flexible joint that is also leak free is essential to a safe driver environment. Exhaust leaking from a joint under the cab or sleeper compartment can enter those compartments and adversely affect the occupants and driver. This has been recognized by Federal Motor Carrier Safety Regulation 393.83(g), which states, in part, that "[n]o part of the exhaust system shall leak or discharge at a point forward of or directly below the driver/sleeper compartment."

BRIEF DESCRIPTION OF THE DRAWINGS

FIG. 1 is a perspective view of a leak-free flexible conduit according to an embodiment of the invention.

FIG. 2 is an enlarged, cross-sectional view of a portion of the conduit of FIG. 1 that illustrates the seal between the outer flexible hose and the inner flexible metal hose.

DETAILED DESCRIPTION OF THE INVENTION

Figure 3:
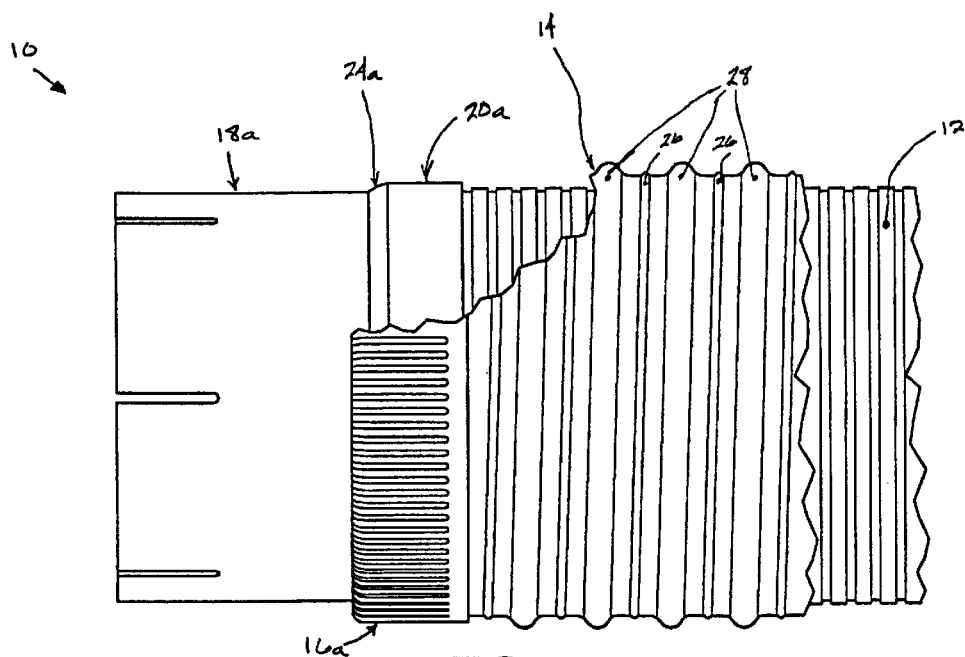
FIG. 3 is a partial side elevation view of the conduit of FIG. 1 with a portion of the outer flexible hose broken away.

A leak-free flexible conduit 10 according to an embodiment of the invention is shown in FIGS. 1, 2, and 3, wherein like numbers indicate like elements throughout.

FIG. 1 is a perspective view of a leak-free flexible conduit according to an embodiment of the invention. The leak-free conduit 10 comprises an inner flexible hose 12 (seen in FIGS. 2 and 3) and an outer flexible hose 14. In FIG. 1, the inner flexible hose 12 is not shown because it is completely obscured by the outer flexible hose 14. In one embodiment of the invention, the inner flexible hose 12 is a commercially available, interlocking, flexible, stainless steel hose. Inner flexible hose 12 permits axial compression, axial extension, and flexing or bending of the hose walls relative to the longitudinal axis of the hose. In the present embodiment, the inner flexible hose 12 is of the type used in a connection between an engine and an exhaust system. Although a metal hose is used in the present embodiment, any hose that can move like inner flexible hose 12 while resisting heat generated by exhaust gasses may be used. The inner flexible hose 12 is well-suited to withstand the heat of exhaust gases, which can range up to approximately 1000 degrees, but it will invariably leak some of the exhaust, even at the relatively low exhaust gas pressures that are typically found within the inner flexible hose 12.

In one embodiment of the invention, the outer flexible hose 14 is a two-ply, fiberglass-reinforced, silicone rubber hose that is also reinforced with a wire 26 made of spring steel and helically embedded between the plys along the length of the outer flexible hose 14. The silicone rubber provides sealing and flexibility while the fiberglass reinforces and makes the shape more rigid and insulates from heat. Such an outer flexible hose 14 can typically withstand temperatures up to 600 degrees Fahrenheit. Any material that is flexible, air tight, and able to withstand the temperatures generated by the exhaust gasses can be used to make outer flexible hose 14. The outer flexible hose 14 can alternatively be reinforced with materials other than fiberglass, such as Nomax or ceramic cloth. The outer flexible hose 14 permits axial compression, axial extension, and flexing or bending of the hose walls relative to the longitudinal axis of the hose. The wire 26 prevents the outer flexible hose 14 from collapsing onto the inner flexible hose 12 when the outer flexible hose 14 is heated by escaping exhaust gases, and also insures a constant gap between the inner flexible hose 12 and the outer flexible hose 14. In an alternative embodiment, the wire 26 does not need to be embedded between the elastomeric layers of outer flexible hose 14 as long as it is located between and separates the inner flexible hose 12 from the outer flexible hose 14.

FIG. 2 is an enlarged, cross-sectional view of one end of the conduit of FIG. 1 that illustrates the seal between the outer flexible hose 14 and the inner flexible hose 12. FIG. 3 is a partial side elevation view of one end of the conduit of FIG. 1 with a portion of the outer flexible hose broken away. A pipe adapter 18a is welded or permanently attached to a hose adapter ring 20a with a weld 24a to produce an airtight joint. The pipe adapter 18a and hose adapter ring 20a are preferably composed of steel, but any other suitable high-temperature material could be used. As shown in FIG. 1, pipe adapters 18a, 18b provide means for attaching the flexible conduit 10 to pipes (not shown) on each end of flexible conduit 10. In this embodiment, the flexible conduit 10 is connected between an engine (not shown) and an exhaust pipe (also not shown). Returning to FIGS. 2 and 3, the end of inner flexible hose 12 is placed between the pipe adapter 18a and the hose adapter ring 20a. The pipe adapter 18a, hose adapter ring 20a, and the end of the inner flexible hose 12 are connected to weld 24a. The inner flexible hose 12 is able to contract and expand along the longitudinal axis without restriction. The other end of flexible conduit 10, although not shown in FIG. 2 or 3, is similarly constructed.

In this embodiment of the invention, the outer flexible hose 14 is attached to the hose adapter ring 20a with a commercially available crimp-on steel collar 16a. The other crimp-on steel collar 16b that attaches the other side of the outer flexible hose 14 at the other end of flexible conduit 10 can be seen in FIG. 1. Returning to FIGS. 2 and 3, insulating layer 22a is placed between the radially inner surface of crimp-on steel collar 16a and the radially outer surface of hose adapter ring 20a, forming a sealed annulus 13 between inner flexible hose 12 and outer flexible hose 14. Insulating layer 22a may be composed of fiberglass, stove insulation, or any other suitable material. In other embodiments of the invention, the sealed annulus 13 formed between inner flexible hose 12 and outer flexible hose 14 could also be filled with insulation, although air is the preferred insulator because it does not bind any of the joints of inner flexible hose 12 or outer flexible hose 14. Furthermore, although the sealed annulus 13 could be made to be any suitable depth, it is preferable to minimize the overall diameter of leak-free conduit 10 because the area where exhaust pipes are routed tends to be crowded. The other end of flexible conduit 10, although not shown in FIGS. 2 and 3, is similarly constructed.

By increasing the length of the outer flexible hose 14 as well as the insulation 22a, the position of the crimp-on steel collar 16a may be extended so that crimping occurs over the pipe adapter 18a instead of hose adapter ring 20a. This alternate location of the crimp-on steel collar 16a does not require an 100% air tight weld and allows for hose adapter ring 20a, the inner flexible hose 12, and the pipe adapter 18a to be joined permanently by other means. Permanently attaching the inner flexible hose 12 to pipe adapter 18a at the outer end of the hose adapter ring 20a minimizes the amount that the inner flexible hose 12 flexes at the welds, which is inherently a high-stress location. Thus, the fatigue life of the inner flexible hose 12 is increased.

The outer flexible hose 14 is preferably formed with a ridge 28 running helically throughout its length. Wire 26 is embedded in the outer flexible hose 14 between the humps formed by ridge 28. Although in FIGS. 2 and 3 the reference numbers 26 and 28 are shown multiple times, in reality there is only one ridge 28 and one wire 26 in this particular embodiment because the ridge 28 and the wire 26 are helically wound around the outer flexible hose 14. In one embodiment of the invention, the outer flexible hose 14 is a two-ply, fiberglass-reinforced, silicone hose. In the absence of ridge 28, the fiberglass or other reinforcing material embedded in the silicone might not allow the silicone to properly expand or contract to adjust for relative motion between the engine and the muffler exhaust. Incorporating ridge 28 into outer flexible hose 14 allows the outer flexible hose 14 to both expand and contract along the longitudinal axis of the flexible conduit 10.

In other embodiments that do not include ridge 28, other ways for providing for compression and extension of the outer flexible hose 14 are possible. For example, with reference to FIG. 2, the outer flexible hose 14 may be compressed slightly before being attached to the hose adapter ring 20a with the crimp-on steel collar 16a. Although not shown in FIG. 2, the same pre-compression process may be done on the other side of flexible conduit 10 as well. This permits the outer flexible hose 14 to extend to its initial "at rest" position. To facilitate maximum freedom of movement in either direction for this embodiment, outer flexible hose 14 should be incorporated into flexible conduit 10 in a condition approximately halfway between its fully axially extended and fully axially compressed conditions.

In another alternative embodiment, when outer flexible hose 14 is manufactured, the helical wire 26 could be slightly compressed before it is embedded within the silicone. As a result, the hose can be either axially extended or compressed from an at rest condition. Using a hose manufactured in this fashion simplifies the assembly of flexible conduit 10 as outer flexible hose 14 need not be slightly compressed before being attached to the hose adapter 20 with the crimp-on steel collar 16; it is merely attached in its "at rest" condition.

FIGS. 4 through 7 illustrate manufacture of a flexible outer hose 14 according to one embodiment of the invention where the flexible outer hose 14 is a two-ply, fiberglass-reinforced, silicone rubber hose. Each of the FIGS. 4–7 are drawn as if the longitudinal axis of the outer flexible hose 14 were perpendicular to the plane of the paper.

Figure 4:
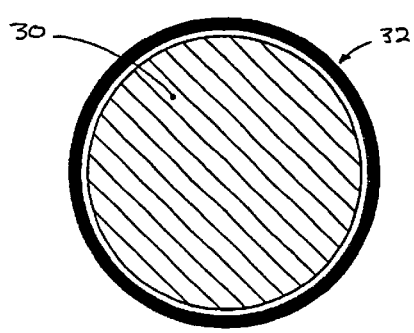
FIGS. 4–7 are sequential end views of some processes for forming the outer flexible hose of FIG. 1.
Figure 5:
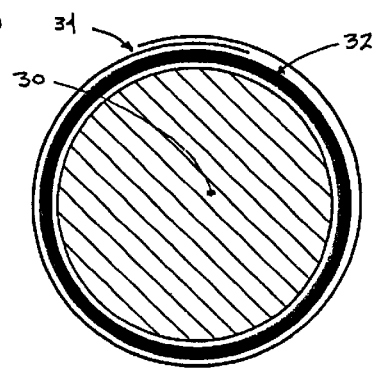
Figure 6:
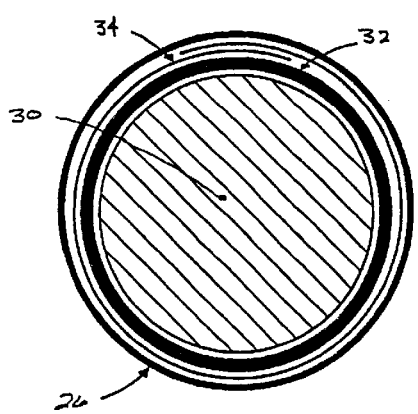

With reference to FIG. 4, a rope 32 is helically wrapped around mandrel 30. The rope 32 is used to create the helically wrapped ridge 28 in the outer flexible hose 14, as seen in FIGS. 1, 2, and 3. Next, in FIG. 5, an inner ply 34 is wrapped around mandrel 30 and rope 32. Inner ply 34 substantially overlaps itself on one side of mandrel 30, creating a strong seam. Next, as seen in FIG. 6, wire 26 is helically wrapped around mandrel 30, rope 32, and inner ply 34. Wire 26 is positioned between ridge 28 created by rope 32. Finally, in FIG. 7, an outer ply 36 is wrapped around mandrel 30, rope 32, inner ply 34, and wire 26. Outer ply 36 substantially overlaps itself on one side of the mandrel 30, creating a strong seam. The seams of inner ply 34 and outer ply 36 are arranged so that they are substantially 180 degrees apart from each other, which improves the stability and life of the outer flexible hose 14. In this embodiment, outer ply 36 is constructed of three separate layers (not shown)—an inner fiberglass mat is sandwiched between two outer layers of silicone rubber. The fiberglass layer reinforces the outer flexible hose 14. In this embodiment, inner ply 34 has two separate layers (not shown)—a radially outer fiberglass layer and a radially inner silicone rubber layer. The inner silicone rubber layer creates a smooth silicone inside surface of the outer flexible hose 14, which helps to create an airtight seal after the outer flexible hose 14 is attached to the hose adapter ring 20a that is shown in FIGS. 2 and 3. In this embodiment, wire 26 is placed between inner ply 34 and outer ply 36, preventing the ends of wire 26 from being exposed.

Figure 7:
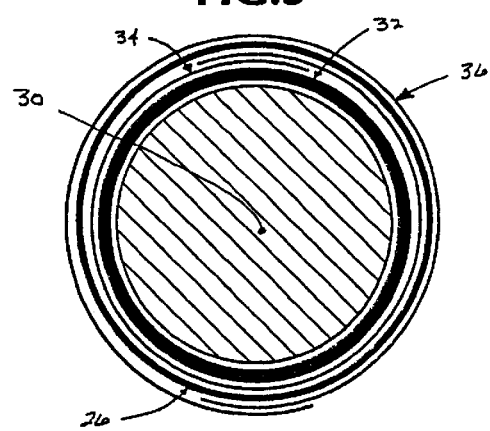

The assembly shown in FIG. 7 is heated in an oven to merge the inner ply 34 and outer ply 36, along with wire 26. After heating, outer flexible hose 14 and rope 32 are removed from mandrel 30. Rope 32 is then removed from the inside surface of outer flexible hose 14, leaving behind the ridge 28. Another method (not shown) used to manufacture ridge 28 in the outer flexible hose 14 is to build a mandrel with a ridge machined directly on the mandrel. Once the silicone has cured, the outer flexible hose 14 can be removed by unscrewing it from the mandrel.

In the described embodiment, inner ply 34 and outer ply 36 are commercially available. Many commercially available variations on the number of silicone rubber layers and number of fiberglass layers are possible when manufacturing a flexible outer hose 14 in accordance with embodiments of the invention. The number of silicone layers might be increased, for example, if more heat resistance was required. Alternatively, other materials besides fiberglass, such as ceramic cloth, may be embedded between silicone rubber layers to reinforce the flexible outer hose 14.

When a flexible conduit, like-flexible conduit 10, constructed in accordance with the invention, is installed between a vehicle engine and exhaust system, it can be seen that exhaust gases escaping from the inner flexible hose 12 do not escape to the atmosphere because of the airtight seal formed by the outer flexible hose 14. In addition, the outer flexible hose 14 substantially reduces the heat radiated to the atmosphere when compared to the prior art metal hose operating alone. Furthermore, the outer flexible hose 14 dampens the vibration of the inner flexible hose 12. As a result, the life of inner flexible hose 12 is extended and noise is reduced. Outer flexible hose 14 also protects inner flexible hose 12 from external corrosive elements and dirt, further extending its life.

What is claimed is:

1. A hose assembly for hot gas comprising:
   an inner flexible hose, said hose being made from metal;
   an outer flexible hose, said hose being made from silicon rubber and fiberglass layered to form a wall of said outer hose, said inner and outer hoses being substantially coaxial;
   a helical wire disposed between said silicon rubber and said fiberglass;
   a substantially gas-impervious seal formed between the radially outer surface of said inner hose and the radially inner surface of said outer hose at each end of said hoses; and
   an insulator constructed to withstand temperatures of at least approximately 1,000 degrees Fahrenheit, said insulator being disposed between the radially outer surface of said inner hose and the radially inner surface of said outer hose at each end of said hoses.

2. The hose assembly of claim 1 wherein said hose assembly further includes a plenum formed between said inner and outer hoses.

3. The hose assembly of claim 1 wherein each of said hoses is flexible in all directions.

4. The hose assembly of claim 1 wherein said hose assembly is constructed and arranged to prevent the outer hose from touching the inner hose between each of said seals.

5. The hose assembly of claim 1 wherein a portion of said outer hose forms a helical ridge substantially along the length thereof.

6. The hose assembly of claim 1 wherein said outer hose further includes a helical wire substantially along the length thereof.

7. An exhaust hose assembly comprising:
   an interlocking flexible steel hose;
   a sealing hose made from silicon rubber and fiberglass layered to form a wall of said sealing hose, said steel hose being contained within said elastomeric hose substantially coaxial therewith;
   a first clamp for clamping said sealing hose to said steel hose about the circumference of each at a first location; and
   a second clamp for clamping said sealing hose to said steel hose about the circumference of each at a second location, said hose assembly being constructed and arranged to prevent the finer hose from touching the inner hose between said first and second clamps.

8. The exhaust hose assembly of claim 7 wherein said hose assembly further includes a plenum formed between said steel hose and said sealing hose.

9. The hose assembly of claim 7 wherein each of said hoses is flexible in all directions.

10. The hose assembly of claim 7 wherein a portion of said sealing hose forms a helical ridge substantially along the length thereof.

11. The hose assembly of claim 7 wherein said sealing hose further includes a helical wire substantially along the length thereof.

12. The hose assembly of claim 7 wherein said hose assembly further includes a helical wire disposed between said silicone rubber and said fiberglass.

13. A flexible hose for use in a high temperature environment comprising:
    a cylindrical body having at least one elastomeric layer and at least one substantially inelastic layer, said layers being sealed to one another, said body comprising an outer sheet having a radially outer fiberglass layer and a radially inner silicone rubber layer and an inner sheet having a fiberglass middle layer, a radially outer silicone rubber layer, and a radially inner silicone rubber layer;
    a helical wire formed substantially along the length of said body and being sealed between said layers; and
    a helical ridge formed substantially along the length of said body in both layers.

14. The hose of claim 13 wherein said elastomeric layer comprises silicone rubber.

15. The hose of claim 13 wherein said substantially inelastic layer comprises fiberglass.

16. The hose of claim 13 wherein said wire is contained between said inner and outer sheets.

17. The hose of claim 13 wherein said ridge is formed in each of said sheets.

18. The hose of claim 13 wherein said outer sheet and said inner sheet are substantially sealed together.

19. An exhaust hose assembly comprising:
    an interlocking flexible steel hose;
    an elastomeric sealing hose, said steel hose being contained within said elastomeric hose substantially coaxial therewith;
    a first clamp for clamping said sealing hose to said steel hose about the circumference of each at a first location;
    a second clamp for clamping said sealing hose to said steel hose about the circumference of each at a second location; and
    an insulator constructed to withstand temperatures of at least approximately 1,000 degrees Fahrenheit, said insulator being disposed between the radially outer surface of said steel hose and the radially inner surface of said sealing hose adjacent each of said clamps.

20. A flexible hose for use in a high temperature environment comprising:
    a cylindrical body having an elastomeric layer and a substantially inelastic layer, said body comprising an outer sheet having a radially outer fiberglass layer and a radially inner silicone rubber layer and an inner sheet having a fiberglass middle layer, a radially outer silicone rubber layer, and a radially inner silicone rubber layer;
    a helical wire formed substantially along the length of said body; and
    a helical ridge formed substantially along the length of said body.

21. The hose of claim 20 wherein said wire is contained between said inner and outer sheets.

22. The hose of claim 20 wherein said ridge is formed in each of said sheets.

23. The hose of claim 20 wherein said outer sheet and said inner shoot are substantially sealed together.

* * * * *

UNITED STATES PATENT AND TRADEMARK OFFICE
CERTIFICATE OF CORRECTION

PATENT NO. : 6,769,452 B2  Page 1 of 1
APPLICATION NO. : 10/301164
DATED : August 3, 2004
INVENTOR(S) : Qutub et al.

It is certified that error appears in the above-identified patent and that said Letters Patent is hereby corrected as shown below:

Column 4, line 66, "like-flexible conduit 10," should read --like flexible conduit 10,--.

Column 5, line 58, "the finer hose" should read --the outer hose--.

Column 6, line 65, "inner shoot are" should read --inner sheet are--.

Signed and Sealed this

Fourth Day of September, 2007

JON W. DUDAS
*Director of the United States Patent and Trademark Office*